United States Patent [19]
Swilley et al.

[11] Patent Number: 5,338,250
[45] Date of Patent: Aug. 16, 1994

[54] PLATE DEBONER

[75] Inventors: Wilson H. Swilley, Persia; Michael D. Wohlhutter, Harlan, both of Iowa

[73] Assignee: Bond Equipment Corp., Logan, Iowa

[21] Appl. No.: 961,421

[22] Filed: Oct. 15, 1992

[51] Int. Cl.⁵ .............................................. A22B 5/16
[52] U.S. Cl. ..................................... 452/136; 452/127; 452/171
[58] Field of Search ............... 452/135, 125, 127, 136, 452/171

[56] References Cited

U.S. PATENT DOCUMENTS 3,613,154  10/1971  Townsend ........................... 452/127

FOREIGN PATENT DOCUMENTS

246700   6/1987  Fed. Rep. of Germany ...... 452/125
2481636  11/1981  France ................................. 452/127

Primary Examiner—Wllis Little
Attorney, Agent, or Firm—Lloyd L. Zickert

[57] ABSTRACT

A plate deboner for processing a rib plate by severing the lean portion from the rib portion along a desired cut line by rotating the rib plate along the circumference of a drum and over a reciprocating cutting blade located below the center axis of the drum.

31 Claims, 9 Drawing Sheets

PLATE DEBONER

This invention relates in general to a plate deboner, and more particularly to a power-driven plate deboner for efficiently processing a rib plate of a slaughtered animal by separating the lean portion of the rib plate from the rib portion along a desired cutting line, and still more particularly to a plate deboner capable of maximizing the size of the lean portion cut from the rib portion.

BACKGROUND OF THE INVENTION

Heretofore, the meat processing industry has used a variety of hand-held knives, saws, and other such devices to manually sever the lean portion of the rib plate from the rib portion of the rib plate. The separation of these two portions of the rib plate using such devices is generally time consuming and highly inefficient because a person must physically control the cutting and the processing of each rib plate.

SUMMARY OF THE INVENTION

The present invention overcomes these problems in providing a new and improved adjustable plate deboner for processing a rib plate which severs the lean portion from the rib portion along a desired cutting line and adjusts to maximize the size of the lean portion separated from the rib portion for differing size rib plates. The plate deboner of the present invention includes a rotatably driven spiked drum which grips a rib plate and rotates the rib plate downward about the circumference of the drum while an adjacent spring-biased guide plate urges the rib plate toward the drum until the rib plate is rotated to the approximate height of the center axis of the drum. At that point in the rotation of the rib plate, a spring-biased rotatably driven knurled roller, synchronously driven with the drum and positioned below the guide plate, holds the rib plate against and in engagement with the drum and further coacts with the drum to drive the rib plate downward toward an adjustable floating reciprocating cutting blade. The cutting blade, which is mounted parallel to a tangent of the drum below the center axis of the drum, cuts the rib plate along a desired cutting line as the rib plate is driven over the cutting blade, such that the rib portion of the rib plate is carried between the drum and the cutting blade and the lean portion of the rib plate is carried on the opposite side of the cutting blade. A rotatably driven spring-biased rotating small spiked roller which is synchronously driven with the drum and positioned below the knurled roller urges the rib plate toward the drum and further coacts with the drum to pull the lean portion of the rib plate over the reciprocating cutting blade to sever the lean portion from the rib portion. The combination of the spiked drum, the spring-biased guide plate, the spring-biased knurled large roller, the spring-biased spiked small roller, and the adjustable reciprocating blade placed below the center axis of the drum provide the plate deboner with the ability to cut variously sized, tapered and non-tapered rib plates along the desired cutting lines.

It is therefore an object of the present invention to provide a new and improved plate deboner for processing a rib plate and severing the lean portion from the rib portion, thereby greatly reducing the time necessary to process the rib plate.

Another object of the present invention is to provide a new and improved adjustable plate deboner for processing rib plates of varying sizes to sever the lean portion from the rib portion, thereby providing an efficient method of processing rib plates.

Yet another object of the present invention is to provide a new and improved adjustable plate deboner for processing rib plates from various types of livestock by severing the lean portion from the rib portion, thereby providing an efficient time-saving method of processing rib plates.

Other objects, features and advantages of the invention will be apparent from the following detailed disclosure, taken in conjunction with the accompanying sheet of drawings, wherein like reference numerals refer to like parts.

DESCRIPTION OF THE INVENTION

The plate deboner of the present invention provides a device which efficiently separates the lean portion from the rib portion of a rib plate of an animal along a desired cutting line using an integral closed loop hydraulic system which powers a stationary rotating spiked drum, a spring-biased rotating knurled roller, a spring-biased rotating spiked roller, and an adjustable floating reciprocating cutting blade positioned below the center axis of the spiked drum between the spiked drum and the spiked roller.

Although the plate deboner of the present invention is suited to process a beef rib plate, it should be appreciated that the plate deboner of the present invention could be modified to process a pork rib plate or other rib plates from various types of livestock. Depending on the average size of the rib plate, the size of the drum and rollers may vary.

Figure 1:
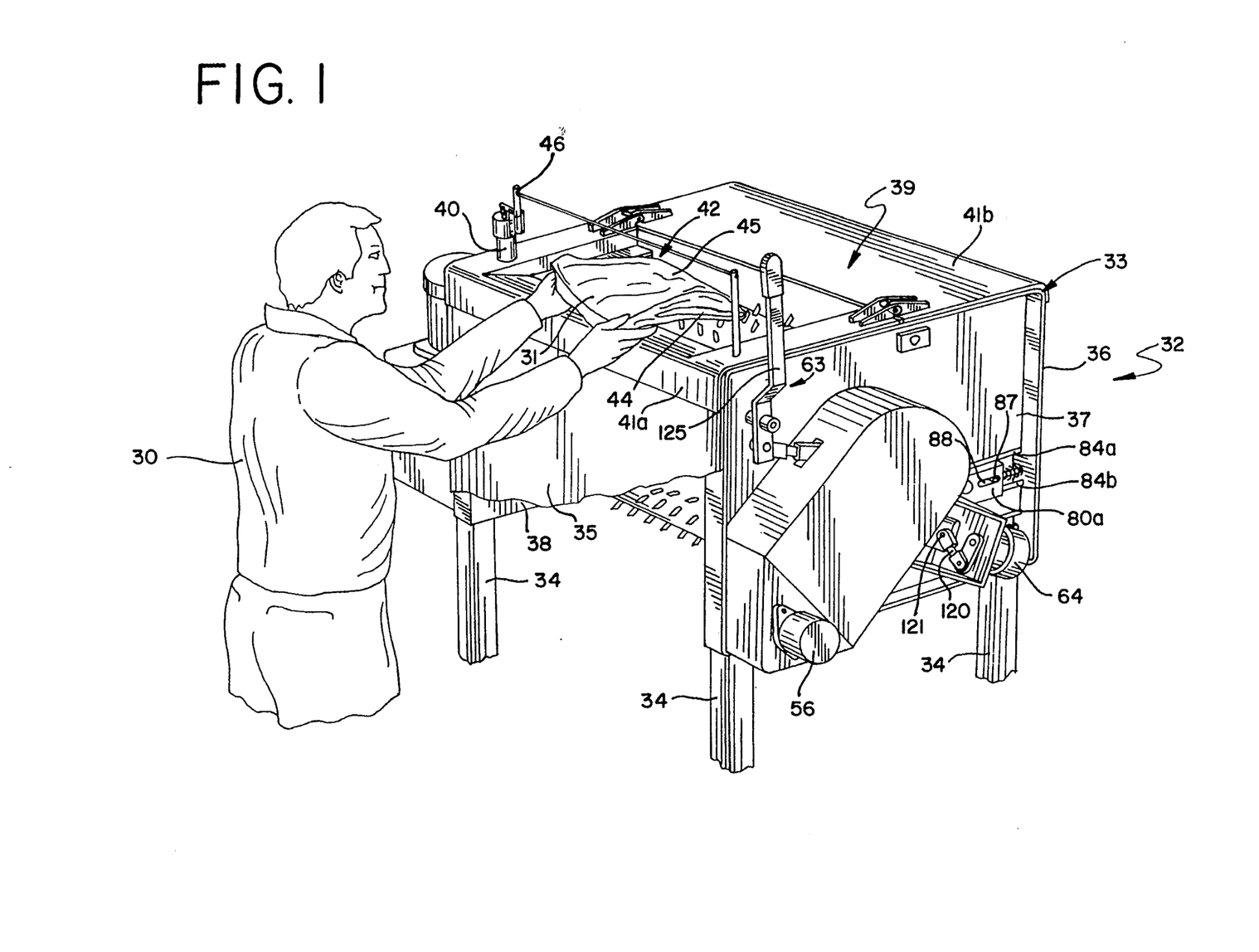
FIG. 1 is a perspective view of the plate deboner of the present invention illustrating a person feeding a rib plate to the deboner for processing.

Referring now to the drawings, FIG. 1 illustrates a person 30 feeding a beef rib plate 31 into the plate deboner 32 of the present invention. The plate deboner 32 includes a housing 33 supported by four legs 34 (one leg not shown). The housing 33 has a front wall 35, a back wall 36, a right side wall 37, a left side wall 38, and a top wall 39. The top wall 39 includes two suitably hinged covers 41a and 41b, cover 41a being positioned toward the front wall 35 of the plate deboner and cover 41b being positioned toward the back wall 36 of the plate deboner. These covers 41a and 41b allow access to the plate deboner for cleaning and maintenance. Cover 41a includes an inlet opening 42 or chute through which the rib plate 31 is inserted into the plate deboner. For safety purposes, the plate deboner has an automatic safety or kill switch 40 connected to the motor driving the hydraulic source pump which produces the pressurized hydraulic fluid for the hydraulic motors (described below) which causes the automatic shutdown of the plate deboner if the cover 41a is lifted. Also for safety purposes, the plate deboner has a standard safety stop cable mechanism 46 positioned above inlet opening 42 and also attached to kill switch 40.

Figure 17:
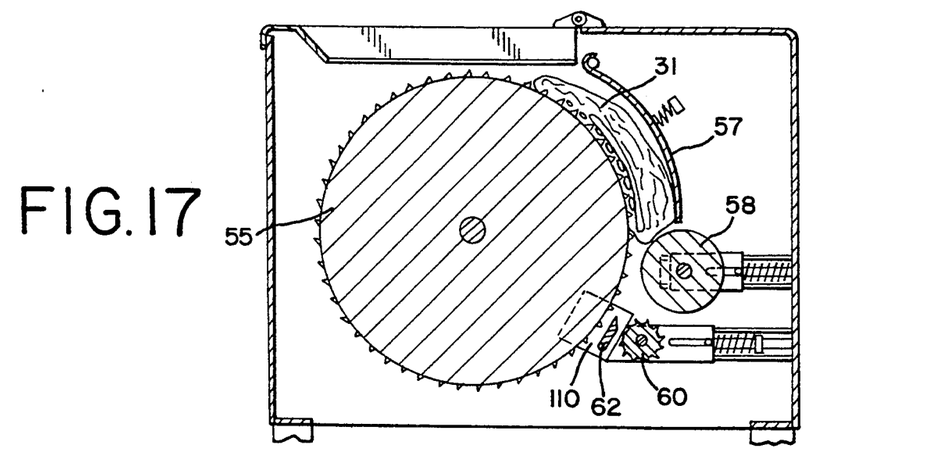
FIGS. 17, 18, and 19 are a series of elevational views of the plate deboner showing a beef rib plate being rotated about the circumference of the spiked drum and over the cutting blade.
Figure 18:
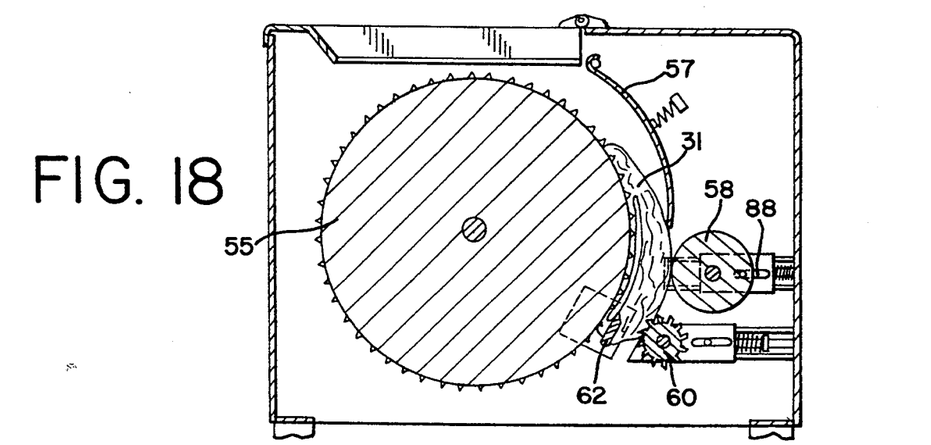
Figure 19:
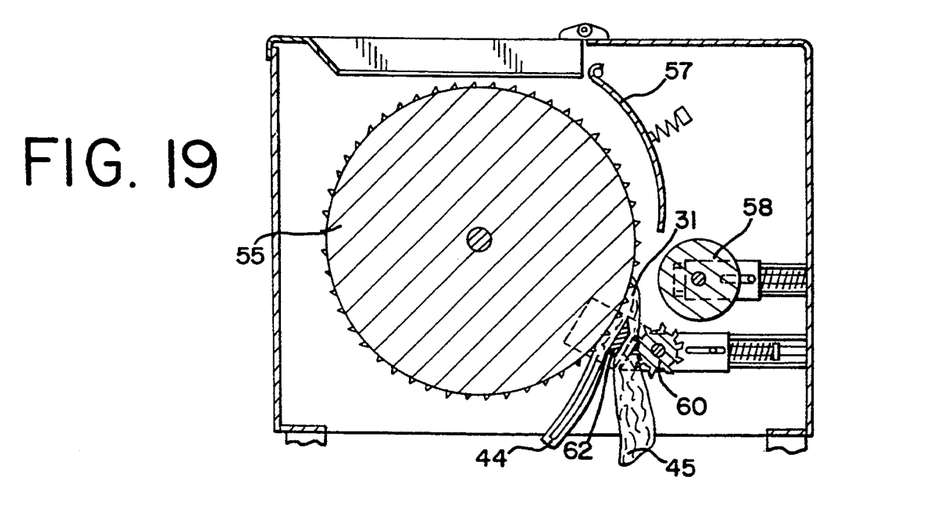

The front wall 35 is broken away in FIG. 1 to illustrate that the bottom end of the housing 33 is open, as seen in FIGS. 17 to 19, through which the two severed portions of a rib plate 31 are discharged. Although not shown, in practice the rib portion 44 and the lean portion 45 are discharged onto a common conveyor and are sorted at a later point. It should be appreciated that the housing 33 acts as a supporting frame for as well as a shield or cover for the internal components of the plate deboner 32.

The plate deboner 32, as further illustrated in FIGS. 2, 3, 4, and 5, includes generally a spiked drum 55 for rotating the rib plate, a drum hydraulic motor 56 for driving the drum, a guide plate 57 for guiding the rib plate along the drum, a knurled large roller 58 coacting with the drum to drive the rib plate toward the knife, a large roller hydraulic motor 59 for driving the roller 58, a spiked small roller 60 coacting with the drum to further drive the rib plate past the knife, a small roller hydraulic motor 61 for driving roller 60, a cutting blade or knife 62 for severing the rib portion from the lean portion of the rib plate, a cutting blade adjustment mechanism 63, and a cutting blade hydraulic motor 64 for reciprocably driving the cutting blade.

The spiked drum 55 is horizontally mounted for rotation between the right side wall 37 and the left side wall 38 of housing 33. The spiked drum 55 is carried on a drum shaft 69 suitably mounted in bearings carried by the side walls, and driven by the drum hydraulic motor 56 through a standard chain or belt drive mechanism 71. The drum hydraulic motor 56 rotates the drum at a desired speed. A plurality of pegs or spikes 72 are mounted on the drum to grip the rib portion of the rib plate. As a rib plate is fed into the plate deboner through the inlet opening 42, the rotating spike drum grips the rib plate and begins the process of rotating the rib plate downward along the circumference of the drum (clockwise in FIG. 2 and counterclockwise in FIG. 3). It should be appreciated that the drum size may vary and that various other gripping elements may be used to grip the rib plate.

Figure 2:
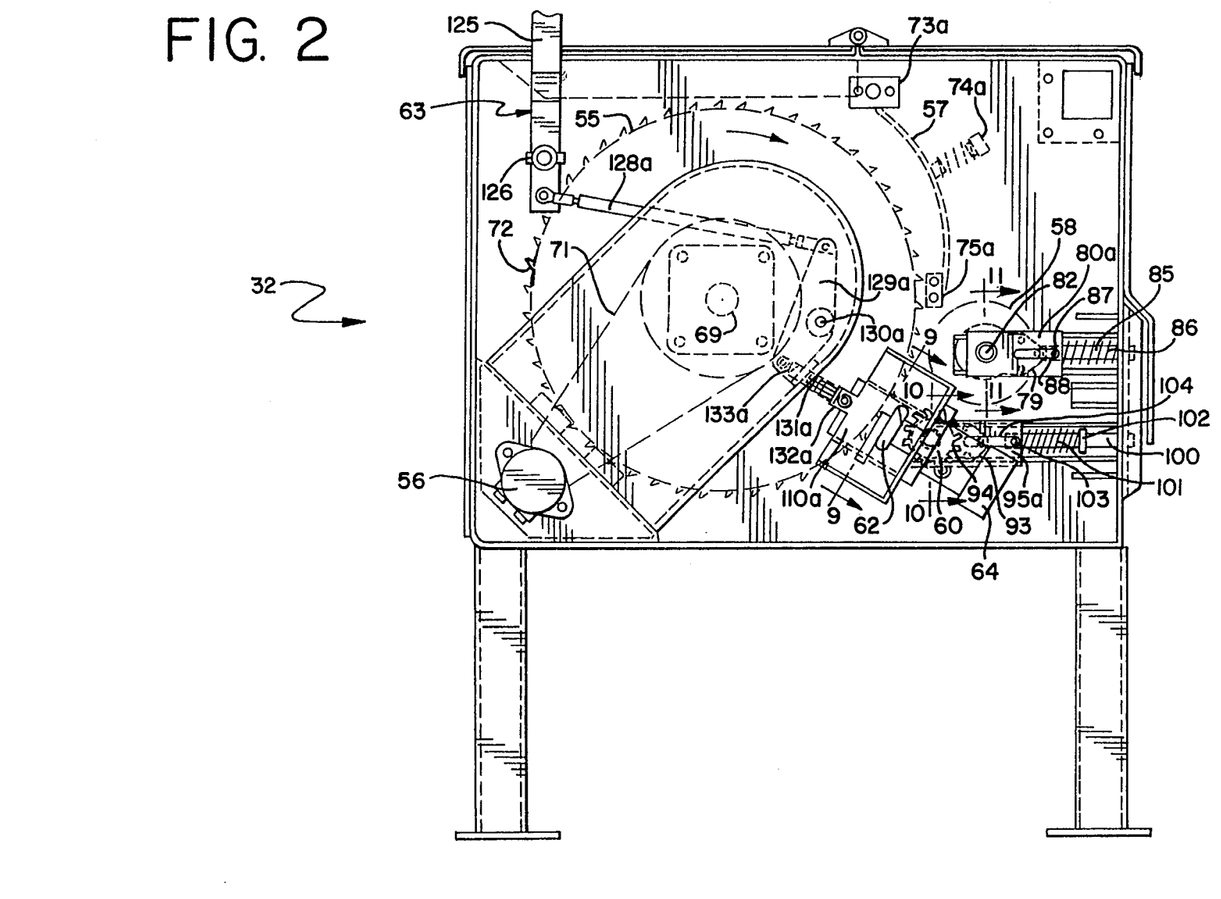
FIG. 2 is a right side elevational view of the plate deboner illustrating in phantom the spiked drum, the spring-biased guide plate, the spring-biased knurled large roller, the spring-biased spiked small roller, the cutting blade, and the cutting blade adjustment mechanism partly in phantom and partly in full.
Figure 3:
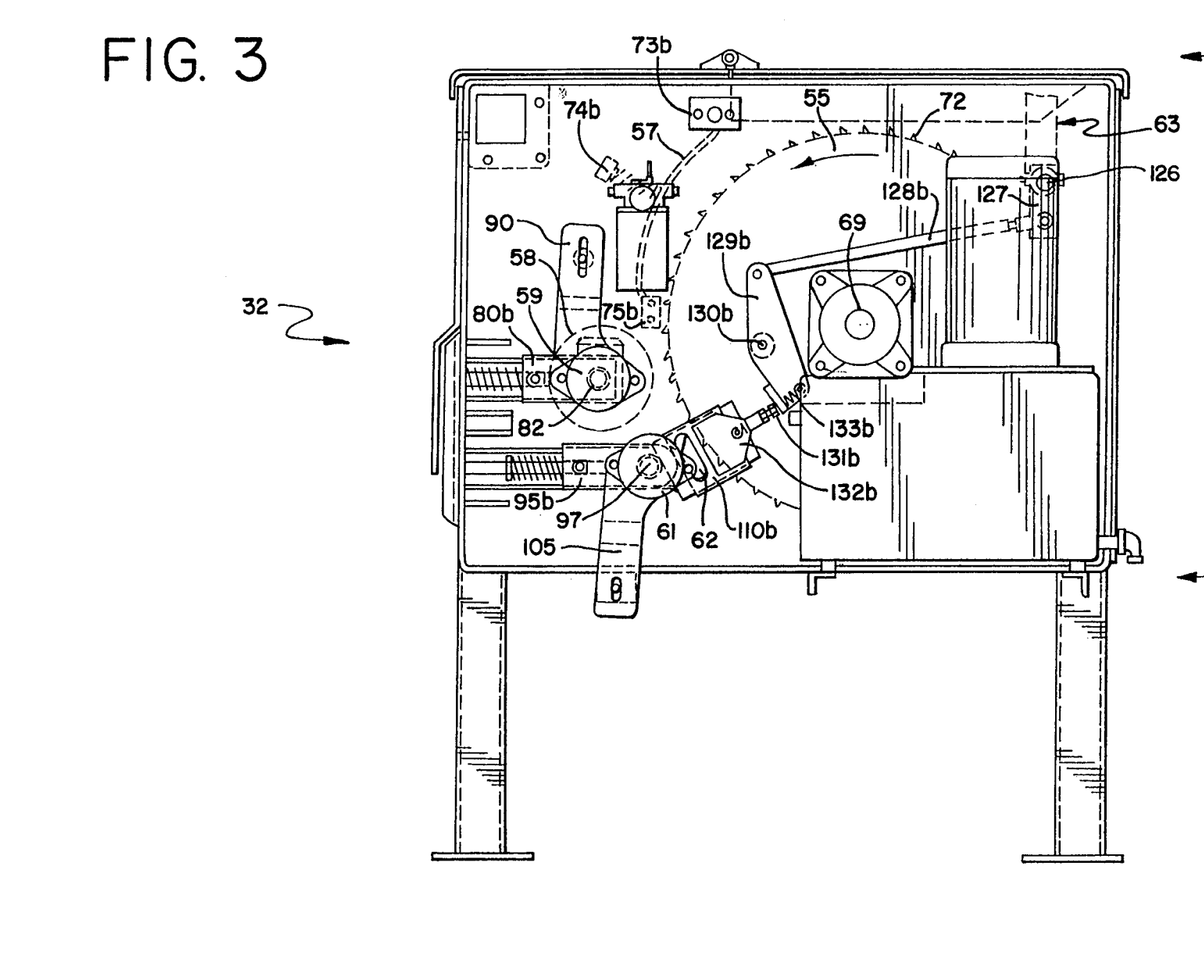
FIG. 3 is a left side elevational view of the plate deboner illustrating in phantom the spiked drum, the spring-biased guide plate, the spring-biased knurled large roller, the spring-biased spiked small roller, and the cutting blade, the upper torque arm for the large roller, the lower torque arm for the small roller in full view, and the cutting blade adjustment mechanism partly in phantom and partly in full.
Figure 4:
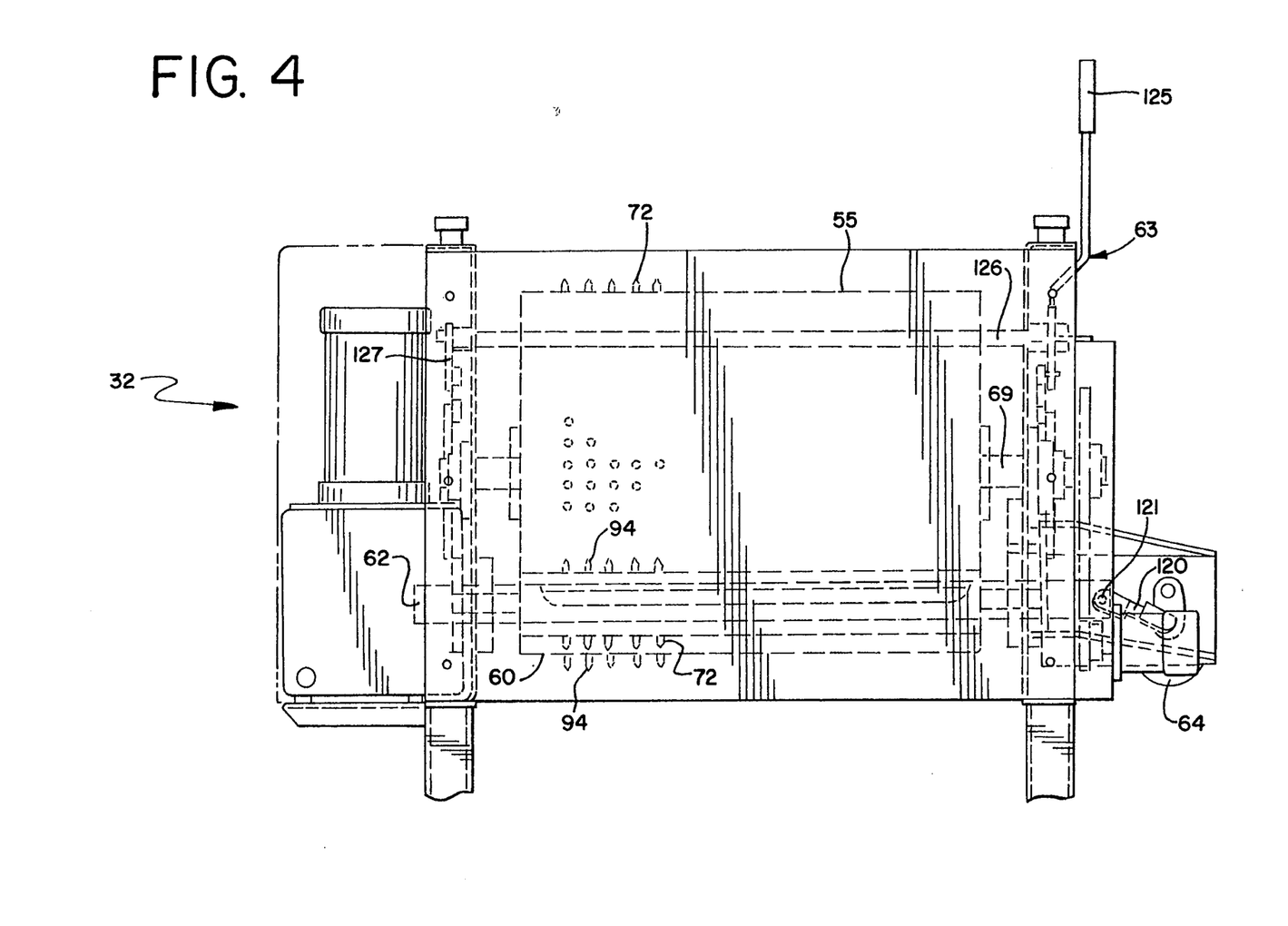
FIG. 4 is an rear elevational view of the plate deboner looking along line 4—4 of FIG. 3 in the direction of the arrows.

Adjacent to the top of the spiked drum 55 is a guide plate 57 which extends horizontally the full width of the drum and vertically downward to the height of the drum shaft 69. As illustrated in FIGS. 2 and 3, the guide plate 57 has a concave shape partially corresponding to the circumference of the drum 55. The guide plate 57 is pivotally mounted on two standard guide plate pivot blocks 73a and 73b. The pivot blocks 73a and 73b are suitably mounted respectively to the right side wall 37 and the left side wall 38 and enable the guide plate 57 to pivot toward and away from the drum 55. The guide plate 57 is biased toward the drum 55 by two standard guide plate spring mechanisms 74a and 74b mounted respectively on the right side wall 37 and the left side wall 37. Two standard guide plate stop blocks 75a and 75b are respectively mounted on the right side wall 37 and left side wall 38 to prevent the guide plate 57 from pivoting too close to the spiked drum 55 and thus provide a minimum spacing between the guide plate 57 and the spiked drum 55 without interfering with movement of the rib plate.

As a rib plate is driven downward along the circumference of the drum 55, the spring-biased guide plate 57 urges the rib plate toward the drum 55 and thus ensures proper gripping of the rib plate by the spiked drum 55. It should be appreciated that the spiked drum 55 and the spring-biased guide plate 57 coact to enable the plate deboner 32 to process different size rib plates and to allow for tapered and non-tapered rib plates.

Below the guide plate 57, the knurled large roller 58 is positioned adjacent to the spiked drum 55. The knurled large roller 58 has a width substantially equal to that of the drum 55 and a diameter substantially smaller than the drum. This roller 58 is mounted horizontally between the right side wall 37 and the left side wall 38 on an identical pair of slide blocks 80a and 80b, one for each end of the shaft, which are identically slidably mounted on the side walls. It should be appreciated that the slide blocks are made from a suitable plastic material, such as Delrin plastic, because it is self-lubricating and known to provide a smooth surface on which other materials such as steel are easily slidable with little friction. "Delrin" is a DuPont trademark.

Figure 11:
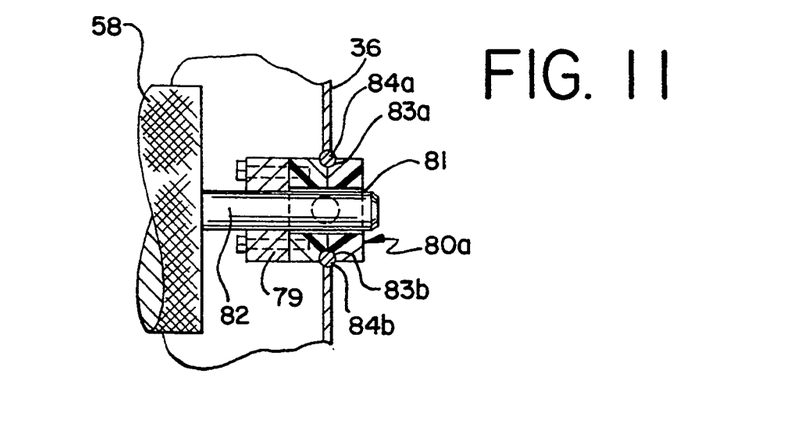
FIG. 11 is a sectional view of the mounting assembly for the knurled large roller taken substantially along line 11—11 of FIG. 2.

The slide block 80a, for example, has a flange bearing 79 which is suitably mounted to its inside face, as shown in phantom in FIG. 2 and in cross section in FIG. 11. This flange bearing journals the shaft 82 of the knurled large roller 58. The slide block also has a horizontally extending hole 81, as best shown in FIG. 11, through which the shaft 82 extends but does not contact. Thus, both slide blocks 80a and 80b support the shaft 82 and the knurled large roller 58 at the desired level slightly below the center axis of shaft 69 of the spiked drum 55. As further illustrated in FIG. 11, the slide blocks 80a and 80b have two semi-cylindrical grooves 83a and 83b which extend the entire length of the blocks. These grooves slidably receive a pair of vertically spaced apart, horizontally extending parallel guide bars 84a and 84b which are connected to the side wall 37 and which extend horizontally therefrom, as also illustrated in FIG. 1. The plastic material of the slide block allows the slide block to be horizontally slidable on these guide bars 84a and 84b. A post 85 mounted on the back wall 36 between the guide bars 84a and 84b projects horizontally toward the drum 55. A coil spring 86 is received on the post 85 and bottomed against the slide block 80a at one end and the back wall 36 at the other end to bias the slide block and thus the knurled large roller toward the spiked drum 55. The end of the post opposite the end attached to the back wall 36 has a transversely extending pin 87 which is guidably received in a slot 88 formed in the slide block 80a. This standard pin-slot construction limits the movement of the slide block toward the drum and thus prevents the large roller from contacting the drum.

Figure 5:
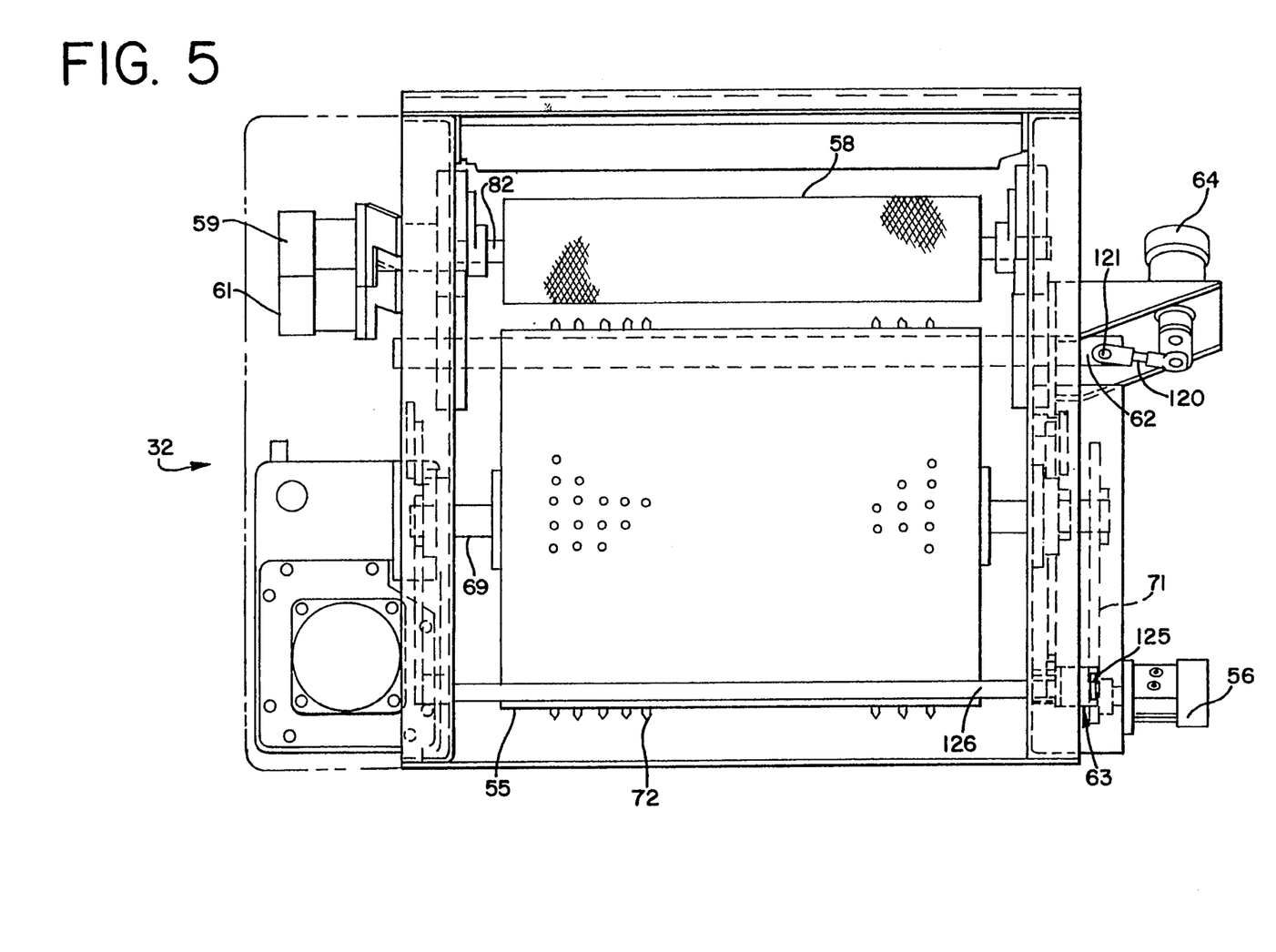
FIG. 5 is a top plan view of the deboner with the top removed illustrating the spiked drum, the knurled large roller, the cutting blade, the drive linkage for the blade including the pitman arm mechanism, the hydraulic motor for the spiked drum, the hydraulic motor for the knurled large roller, the hydraulic motor for the cutting blade, and the hydraulic motor for the spiked small roller.

A large roller hydraulic motor 59 is suitably connected to the shaft 82 of the large roller 58 to rotatably drive the large roller, as seen in FIGS. 3 and 5. The hydraulic motor 59 is supported on an upper torque arm 90 which is pivotally and slidably mounted to the left side wall 38, as illustrated in FIG. 3. This upper torque arm 90 allows the hydraulic motor 59 to move in conjunction with the horizontal movement of the large roller 58 toward and away from the drum 55.

As the rib plate is driven downward by the spiked drum 55 past the center axis of the drum 55, the knurled large roller 58, which is biased toward the drum, contacts the lean portion of the rib plate, and urges the rib plate toward the spiked drum 55. This prevents the force of gravity from dislodging the rib plate from the drum. Moreover, the large roller 58 which rotates in synchronization with the drum 55 coacts with the drum to drive the rib plate downward toward the cutting blade 62 and the spiked small roller 60.

The spiked small roller 60 is mounted below the knurled large roller 58 and adjacent to the cutting blade 62. The small roller 60 has a width substantially equal to the drum 55 and a diameter smaller than roller 58. A plurality of pegs or spikes 94 are mounted on the small roller to grip the lean portion of the rib plate as the small roller rotates in synchronization with the drum 55. It should be appreciated that other gripping devices could be used on the drum, the large roller, and the small roller. The small roller 60 is mounted horizontally between the right side wall 37 and the left side wall 38 on an identical pair of slide blocks or carriages 95a and 95b which are slidably mounted on the side walls and which are similar to the slide blocks of the large roller.

Figure 10:
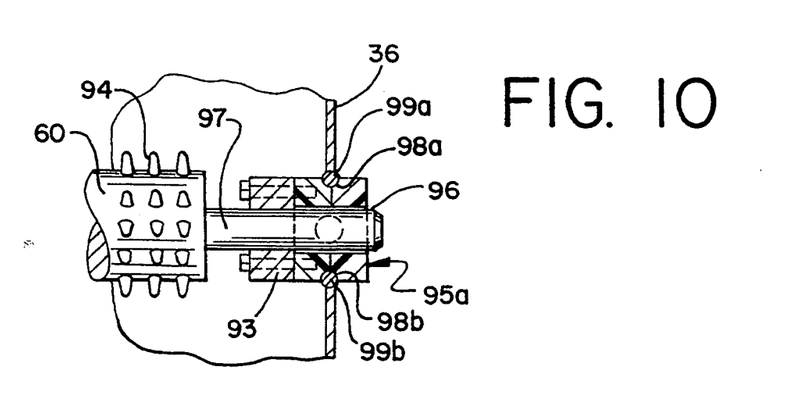
FIG. 10 is a sectional view of the mounting assembly for the spiked small roller taken substantially along line 10—10 of FIG. 2.

The slide block 95b in FIG. 3, for example, is constructed from a trapezoidal block of plastic material having a sloping downward side (shown in phantom) positioned toward or facing the drum 55. Similar to slide blocks 80a and 80b, each slide block 95 has a flange bearing 93 which is suitably mounted to the inside face of slide block 95a, as shown in phantom in FIG. 2 and in cross section in FIG. 10. This flange bearing journals the shaft 97 of the spiked small roller 60. The slide block also has a horizontally extending hole 96 through which the shaft 97 extends but does not contact. Thus, both slide blocks 95a and 95b indirectly hold the ends of the shaft 97 and support the spiked small roller 60 at the desired level slightly below the large roller 58. As further illustrated in FIG. 10, the slide block 95a has two semi-cylindrical upper and lower grooves 98a and 98b which extend the entire length of the block. These grooves slidably receive a pair of vertically aligned parallel guide bars 99a and 99b secured to the side wall 37 and which extend horizontally therefrom. The plastic material of the slide blocks allow the slide blocks to be horizontally slidable on these guide bars 99a and 99b. A post 100 mounted on the back wall 36 between the guide bars 99a and 99b projects horizontally toward the drum 55. A coil spring 101 is received on the post 100 and bottomed at one end on the slide block 95a and at the other end to a collar 102 which is positioned on the post 100 between the slide block and the back wall to bias the slide block and the spiked small roller toward the cutting blade 62 and the spiked drum 55. The end of the post opposite the end attached to the back wall 36 has a transversely extending pin 103 which is guidably received in a slot 104 formed in the slide block 95a. This standard pinslot construction limits the movement of the slide block toward the drum.

A hydraulic motor 61 is suitably connected to the shaft 97 of the small roller 60 to rotatably drive the small roller, as seen in FIG. 3. The hydraulic motor is supported on a lower torque arm 105 which is pivotally and slidably mounted on the left side wall 38, as illustrated in FIG. 3. This lower torque arm 105 allows the hydraulic motor to move in conjunction with the horizontal movement of the small roller toward and away from the drum 55.

As the rib plate is driven downward toward the cutting blade 62 by the spiked drum 55 and the large knurled roller 58, the spiked small roller 60 which is biased toward the drum 55 further contacts and grips the lean portion of the rib plate. Thus, the small roller 60, which is synchronously driven with the drum 55, coacts to drive or pull the rib plate over the cutting blade 62.

Figure 9:
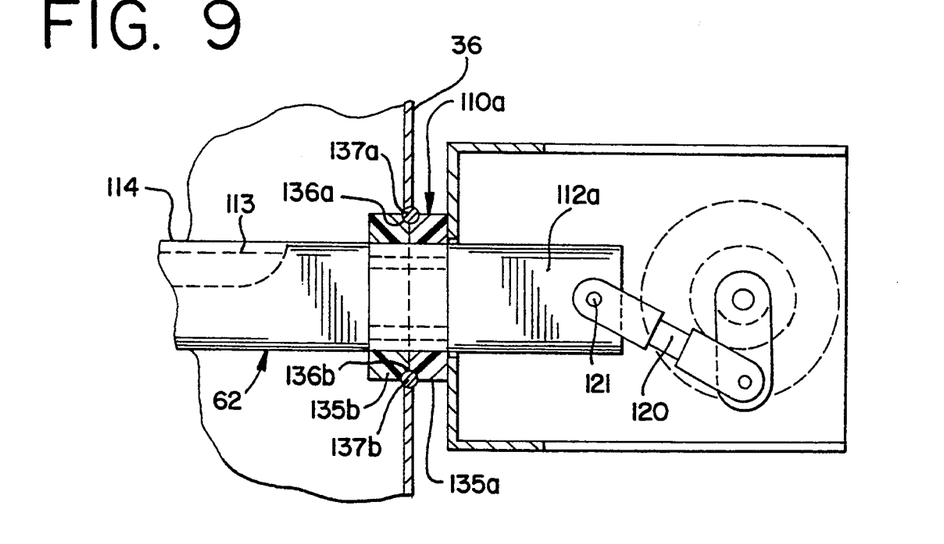
FIG. 9 is a sectional view of the cutting blade mounting at one end taken substantially along line 9—9 of FIG. 2.
Figures 12, 13, 14, 15:
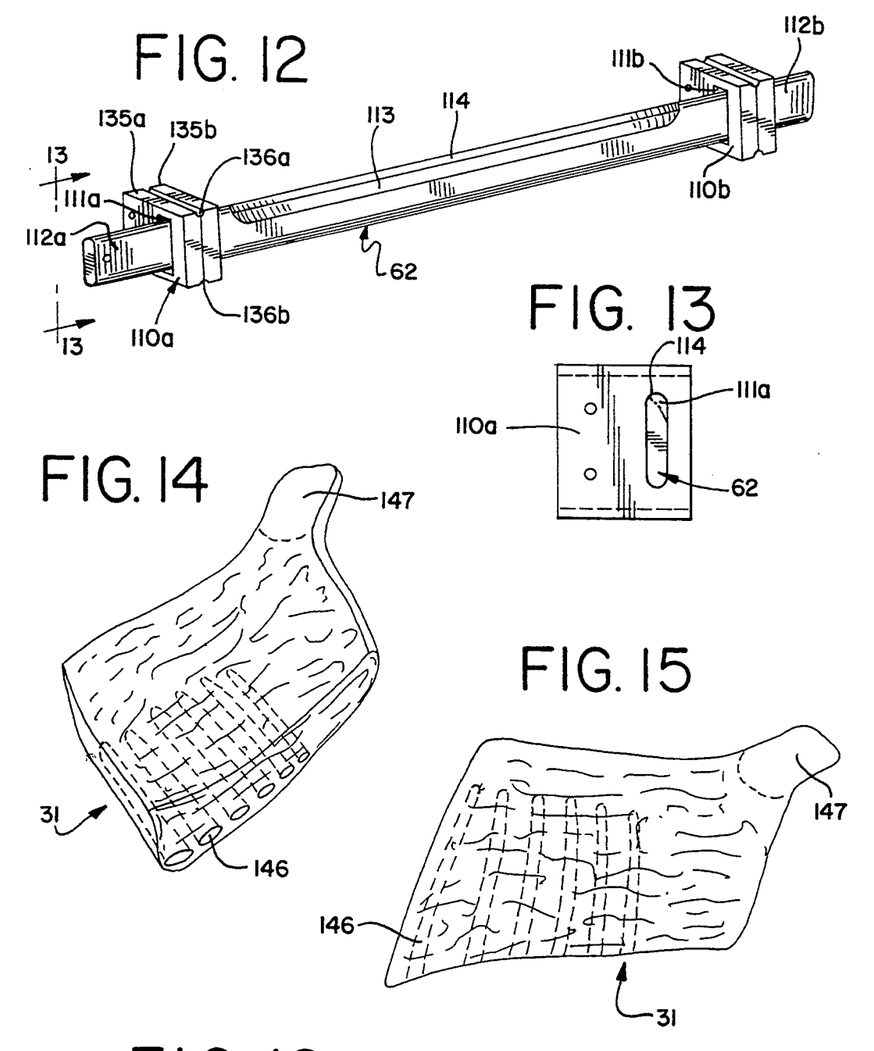
FIG. 12 is a perspective view of the cutting blade mounted in the two plastic blocks.
FIG. 13 is an end elevational view showing the cutting blade mounted in a plastic block taken substantially along line 13—13 of FIG. 12.
FIG. 14 is a perspective view of a beef rib plate illustrating the tapering of the plate.
FIG. 15 is a top elevational view of a beef rib plate showing the ribs in phantom.

The cutting blade 62 as illustrated in FIGS. 9, 12, and 13 is slidably mounted in two plastic blocks 110a and 110b which are in turn slidably mounted in the right side wall 36 and the left side wall 37, as described below. Each block has an elongated opening 111a and 111b, respectively, for slidably receiving the cutting blade 62. The cutting blade includes outer sliding segments 112a and 112b and an intermediate cutting segment 113. The sliding segments 112a and 112b are generally oval in cross section and are thus smoothly conformed to slide back and forth in the oval openings 111a and 111b of blocks 110a and 110b, respectively. The cutting segment 113 of the cutting blade 62, as illustrated in cross-section in FIG. 13, is configured as a standard knife with a sharp edge 114 for cutting the rib plate.

A cutting blade hydraulic motor 64 is drivingly connected to a standard pitman arm 120. As seen in FIGS. 1, 4, 5 and 9, the pitman arm 120 is pivotally secured at 121 to the sliding segment 112a of the cutting blade 62. The hydraulic motor 64, through the pitman arm 120 and pivot 121, reciprocably drives the cutting blade 62, thereby providing a clean cut between the rib portion and the lean portion of the rib plate.

The cutting blade 62 which is held by the plastic blocks is positioned parallel to a tangent of the drum 55 at a desired distance from the drum 55. This distance is adjustable by way of the cutting blade adjustment mechanism 63 which is connected to both blocks 110a and 110b, as illustrated in FIGS. 2, 3, 4, and 5. The cutting blade adjustment mechanism 63 includes an adjustable primary lever 125 which extends above the top 39 of the right side of the housing 33 near the front wall 35. The primary lever 125 is rigidly connected to a rotatably mounted shaft 126 which extends horizontally across the housing 33 where it is rigidly connected to a secondary lever 127. This secondary lever moves in conjunction with the primary lever 125. The primary lever 125 and secondary lever 127 are pivotally connected to link or connecting rods 128a and 128b, respectively. Link rods 128a and 128b are respectively connected to crank arms 129a and 129b which are rotatably journaled on shafts 130a and 130b. The shafts 130a and 130b are respectively mounted on the right side wall 37 and the left side wall 38. The crank arms 129a and 129b adjust the slide blocks 110a and 110b by forcibly contacting stops 131a and 131b, respectively, and moving the stops away from the drum. The stops are suitably fastened to brackets 132a and 132b, respectively, which are in turn suitably fastened to slide blocks 110a and 110b. Thus, the stops hold the cutting blade at a desired distance from the drum. Furthermore, springs 133a and 133b are suitably fastened to the slide blocks and the crank arms. These springs continuously urge the slide blocks against the stops and thus the cutting blade toward the drum, thereby biasing said cutting blade toward the drum.

It should be appreciated that each of the plastic blocks 110a and 110b which are slidably mounted on the right side wall 37 and the left side wall 38, respectively, is constructed from two identical half blocks 135a and 135b which are suitably fastened together as best illustrated in FIGS. 9 and 12. When fastened together, the half blocks 135a and 135b form two grooves 136a and 136b, on opposite sides of the block, which are adapted to be slidably received on the side wall sliding bars 137a and 137b which are integrally connected to the side walls. Slide blocks 110b, 95a, and 95b are also similarly constructed.

The slide blocks 110a and 110b abut against the inclined ends of the trapezoidal blocks 95a and 95b and are thus biased toward the drum by the coil springs 101. The cutting blade adjustment mechanism 63 serves to position the cutting blade at a desired distance from the drum 55, thereby limiting movement toward the drum while allowing the blade to be forced away from the drum against the bias of the small roller coil springs 101, depending on the size of the ribs in the rib portion of the rib plate.

Figure 6:
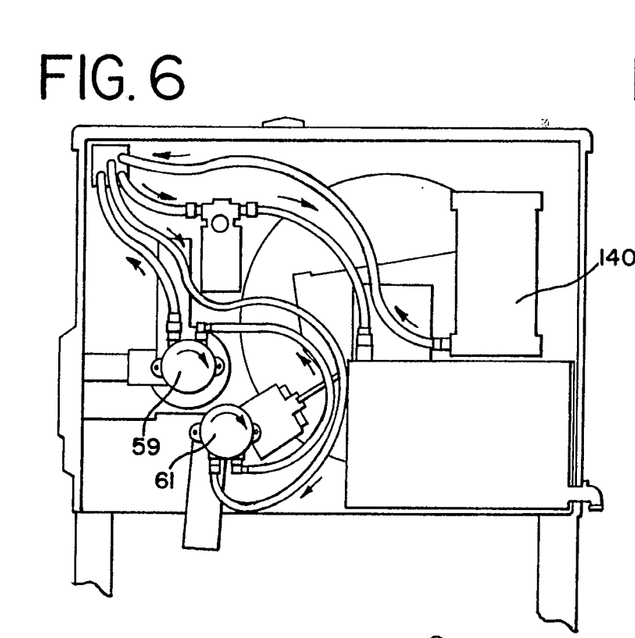
FIG. 6 is a side view of the hydraulic system on the left side of the plate deboner.
Figure 7:
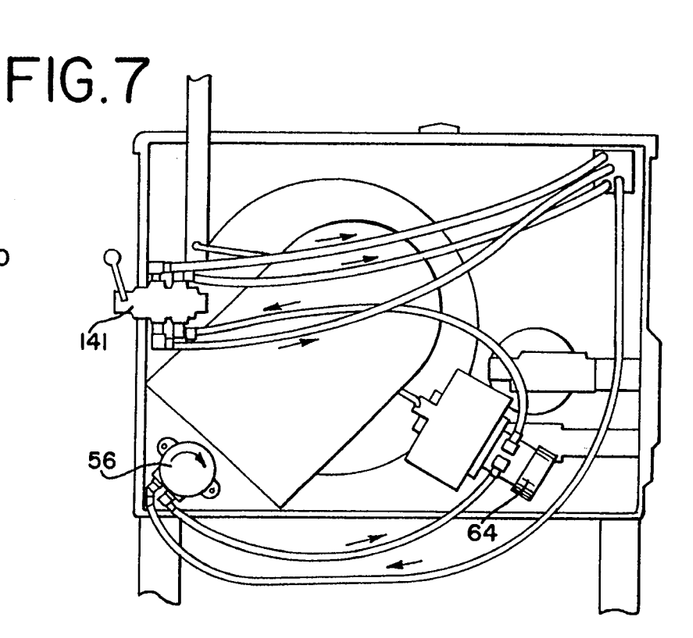
FIG. 7 is a side view of the hydraulic system on the right side of the plate deboner.
Figure 8:
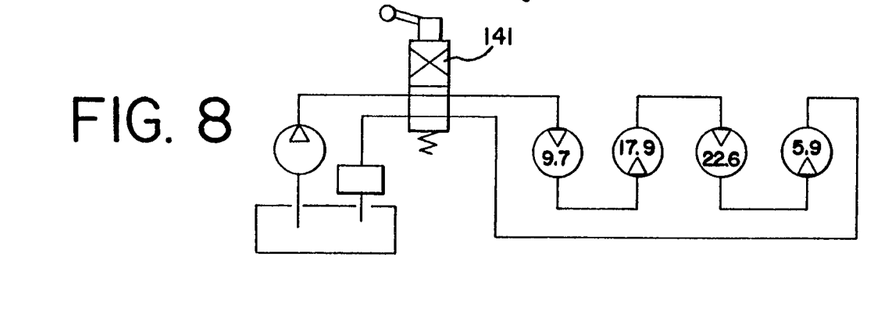
FIG. 8 is a schematic view of the hydraulic system.

The closed loop hydraulic system of the plate deboner 32 is illustrated in FIGS. 6, 7, and 8. The drum 55, the large roller 59, the small roller 60, and the cutting blade 62 are powered by the drum hydraulic motor 56, the large roller hydraulic motor 59, the small roller hydraulic motor 61 and the cutting blade hydraulic motor 64 which are hydraulically connected in series to a hydraulic pump 140 and a standard hydraulic control valve 141. The hydraulic motors for the plate deboner are maintained at constant speed. It should be appreciated that other types of motors to power the components of the plate deboner may be used. It should also be appreciated that the location of the hydraulic pump 140 and the hydraulic control valve 141 may vary.

Figure 16:
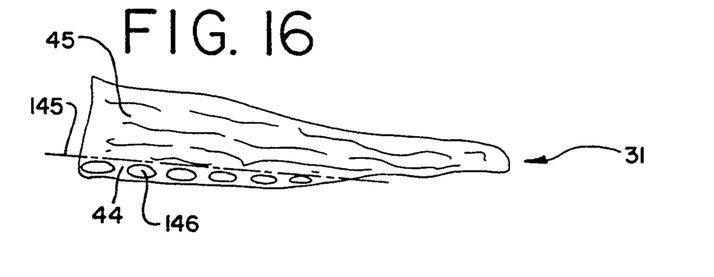
FIG. 16 is a side elevational view of a beef rib plate showing the ribs and the desired cut line.

The typical beef rib plate 31 and the desired cut line 145 between the rib portion 44 and the lean portion 45 is further illustrated in FIGS. 14, 15, and 16. The rib plate 31 is generally tapered in two directions. As the bones 146 decrease in size, the width of the rib plate decreases, as specifically shown in FIGS. 14 and 15. Also, as the bones 146 decrease in length, the thickness of the lean portion of the rib plate decreases, as shown in FIGS. 14 and 16. Attached to the end of the rib plate is a piece of cartilage 147 which remains attached to the lean portion following severing from the rib portion. This cartilage is removed from the lean portion by hand after the rib plate is processed by the plate deboner.

The plate deboner of the present invention accounts for differences in rib plate size of an animal species, as well as rib plates of different species. Referring to FIGS. 17, 18, and 19, a rib plate 31 is shown being moved through the plate deboner 32 of the present invention with the ribs running generally parallel to the direction of rib plate movement. As also shown in FIG. 1, the rib plate 31 is placed with the rib portion 44 facing the spiked drum through the inlet opening 42 at a slight angle whereby the smaller part of the lengthwise taper is directed toward the spiked drum.

When the rib plate is inserted through the inlet opening, the spike roller begins to drive the rib plate about its circumference, as shown in FIG. 17. As the rib plate is carried about the circumference of the drum 55 above the center axis of the drum, the spring-biased guide plate 57 urges the rib plate toward the spiked drum, thereby ensuring that the rib plate remains connected with the drum 55.

As the rib plate rotates past the center axis of the drum 55, the spring-biased rotating knurled large roller 58 urges the entire rib plate 31 toward the drum 55 as specifically illustrated in FIG. 18. The large roller further coacts with the drum 55 by gripping the lean portion 45 of the rib plate 31 to coact with the drum and drive the rib plate 31 downward toward the cutting blade 62. It should be appreciated that the drum 55 and the large roller 58 are synchronized such that they apply equal driving force to the opposite sides of the rib plate.

As the rib plate is driven past the large roller, it contacts the reciprocating cutting blade 62 which severs the lean portion 45 from the rib portion 44. As this happens, the rotating spring-biased spiked small roller 60 grips the lean portion 45 and urges the lean portion toward the cutting blade 62 and also pulls the lean portion over the cutting blade 62. It should be appreciated that the drum 55 and the small roller 60 are synchronized such that they apply equal driving force to the opposite sides of the rib plate. Further, because the cutting blade is positioned below the center axis of the drum, the rib portion, by the force of gravity, falls off the drum as it passes the large roller and is severed from the rib plate.

The cutting blade 62 is spaced away from the drum at a desired distance by the cutting blade adjustment mechanism 63 and is spring biased toward the drum 55 by the blocks 110 which hold the cutting blade. Blocks 110 in turn are spring-biased toward the drum 55 by blocks 95 which hold the spiked small roller. This construction allows the cutting blade 62 to move away from the drum 55 when the width of the bones 146 or rib portion 44 increase. As the cutting blade moves away from the drum 55, the small roller also moves the same distance away from the drum. When the lean portion is severed, the lean portion, being driven downward by the small roller, moves between the cutting blade and the small roller. Furthermore, as the width of the lean portion increases, the small roller will move away from the drum independently of the cutting blade. Accordingly, the plate deboner of the present invention is capable of processing various size rib plates with varying tapers and rib sizes.

It will be understood that modifications and variations may be effected without departing from the scope of the novel concepts of the present invention, but it is understood that this application is to be limited only by the scope of the appended claims.

The invention is hereby claimed as follows:

1. A plate deboner for processing a rib plate by separating the lean portion from the rib portion, said plate deboner comprising
   a frame;
   a drum rotatably mounted on said frame about a substantially horizontal axis, said drum having spikes thereon for gripping said rib portion of said rib plate;
   a large roller rotatably mounted on said frame on an axis extending substantially parallel to said axis of said drum, said large roller having a knurled surface for gripping said grip plate and coacting with said drum to drive the rib plate therebetween, said large roller being biased toward said drum;
   a guide plate mounted on said frame, said guide plate extending above said large roller and coacting with said drum to guide said rib plate along said drum to said large roller;
   a small roller rotatably mounted no said frame on an axis extending substantially parallel to the axis of said drum and said knurled roller, said small roller having spikes thereon for gripping said lean portion of said plate and coacting with the drum to drive the rib plate therebetween, said small roller being biased toward said drum and disposed below said knurled roller;
   a cutting blade mounted substantially horizontally on said frame below the axis of said drum and between said drum and said small roller and being biased toward said drum for separating the lean portion from the rib portion; and
   a driving means for rotating said drum, said large roller, and said small roller, and for reciprocating said cutting blade along its axis.

2. The plate deboner of claim 1 wherein said guide plate is biased toward said drum.

3. The plate deboner of claim 1 wherein said large roller and said small roller are spring biased toward said drum.

4. The plate deboner of claim 1 wherein said cutting blade is spring biased toward said drum.

5. The plate deboner of claim 1 wherein said large roller and said small roller are positioned below the axis of said drum.

6. The plate deboner of claim 1 wherein said driving means includes a plurality of hydraulic motors.

7. A plate deboner for processing a rib plate by separating the lean portion from the rib portion, said plate deboner comprising
   a supporting means;
   a rib plate rotating means rotatably mounted on said supporting means about a substantially horizontal axis, said rotating means having ripping means thereon for gripping said rib plate;
   a guide means coacting with said rotating means biased to urge the rib plate into engagement with said rotating means;
   a first coacting means for coacting with the rib plate rotating means to drive a rib plate therebetween and mounted on said supporting means substantially parallel to said axis of said rotating means, said coacting means having a gripping means for gripping said rib plate, said coacting means having a biasing means for urging said rib plate toward said rotating means;
   a second coacting means for coacting with the rib plate rotating means to drive a rib plate therebetween and mounted on said supporting means substantially parallel to the axis of said rotating means and said first coacting means, said second coacting means having a ripping means for gripping said lean portion of said rib plate, said second coacting means having a biasing means for urging said rib plate toward said rotating means and disposed below said first coacting means; and
   a cutting means for separating the lean portion from the rib portion mounted substantially horizontally on said supporting means below the axis of the rotating means and between said rotating means and said second coacting means and being biased toward said rotating means.

8. The plate deboner of claim 7 wherein said supporting means includes a frame having a plurality of legs and which supports a housing.

9. The plate deboner of claim 7 wherein said rib plate rotating means includes a cylindrical drum.

10. The plate deboner of claim 7 wherein said first gripping means for said rotating means includes spikes extending from the rib plate rotating means.

11. The plate deboner of claim 7 wherein said guide means includes a guide plate biased toward said rib plate rotating means.

12. The plate deboner of claim 7 wherein said first coacting means includes a large roller.

13. The plate deboner of claim 7 wherein said gripping means for said first coacting means includes a knurled surface on said first coacting means.

14. The plate deboner of claim 7 wherein said biasing means for said first coacting means includes a coil spring.

15. The plate deboner of claim 7 wherein said second coacting means includes a small roller.

16. The plate deboner of claim 7 wherein said gripping means for said second coacting means includes spikes extending from said second coacting means.

17. The plate deboner of claim 7 wherein said biasing means for said second coacting means includes a coil spring.

18. The plate deboner of claim 7 wherein said cutting means includes a reciprocating cutting blade.

19. A plate deboner for processing a rib plate by separating the lean portion from the rib portion, said plate deboner comprising
   a drum rotatably mounted about a substantially horizontal axis, said drum having gripping means thereon for gripping said rib plate;
   an upper roller rotatably mounted on an axis extending substantially parallel to said axis of said drum, said upper roller having a gripping means thereon for gripping said rib plate, means biasing said upper roller toward said drum and between which said rib plate is driven;

a guide means extending above said upper roller and coacting with said drum to guide said rib plate along said drum to said upper roller;

a lower roller rotatably mounted on an axis extending substantially parallel to the axis of said drum and said upper roller, said lower roller having a gripping means thereon for gripping said lean portion of said plate, said lower roller having a biasing means for urging said lower roller toward said drum and disposed below said upper roller;

a cutting blade mounted substantially horizontally below said axis of said drum and between said drum and said lower roller and having a biasing means for urging said cutting blade toward said drum to facilitate separating the lean portion from the rib portion; and driving means for rotating said drum, for rotating said upper roller, for rotating said lower roller, and for reciprocating said cutting blade along its axis.

20. The plate deboner of claim 19 wherein said driving means includes a series of hydraulic motors.

21. A plate deboner for processing a rib plate by separating the lean portion from the rib portion, said plate deboner comprising a frame;

a drum rotatably mounted on said frame about a substantially horizontal axis;

an upper roller rotatably mounted on said frame on an axis extending substantially parallel to said axis of said drum, said upper roller being biased toward said drum;

a lower roller sized smaller than said upper roller and rotatably mounted on said frame on an axis extending substantially parallel to the axis of said drum and said upper roller, said lower roller being biased toward said drum and disposed below said upper roller;

a cutting blade mounted substantially horizontally below the axis of said drum and on said frame between said drum and said lower roller and biased toward said drum;

means for rotatably driving said drum and rollers and for reciprocating said cutting blade along its horizontal axis; and a guide plate mounted on said frame, said guide plate extending above said upper roller and coacting with said drum to guide said rib plate along said drum to said upper roller;

whereby said drum and said lower roller coact to drive said rib plate toward said cutting blade and said drum and said lower roller coact to drive said rib plate over said cutting blade thereby causing said reciprocating cutting blade to cut said lean portion from said rib portion.

22. The plate deboner of claim 21 wherein said drum has a plurality of spikes extending therefrom.

23. The plate deboner of claim 21 wherein said upper roller has a knurled surface.

24. The plate deboner of claim 21 wherein said lower roller has a plurality of spikes extending therefrom.

25. A plate deboner for processing a rib plate having a rib portion and a lean portion by separating the lean portion from the rib portion, said plate deboner comprising:

a frame a drum rotatably mounted on the frame about a horizontal axis, said drum having means for gripping the rib plate when it is placed thereon with the rib portion against the drum, a horizontally arranged cutting blade for cutting the lean portion from the rib portion, said cutting blade being resiliently mounted on the frame in coacting relation to the drum so that the blade will variably adjust toward and away from the drum to accommodate a varying thickness rib portion, a first roller resiliently mounted on the frame ahead of the cutting blade to coact with the drum and engage the lean portion and maintain the rib plate against the drum prior to engagement by the cutting blade, and to variably adjust toward and away from the drum to accommodate a varying thickness rib plate, means mounted on the frame ahead of the first roller for resiliently urging the rib plate against the drum prior to engagement by the first roller;

a second roller resiliently mounted on the frame in coacting relation to the cutting blade to engage the lean portion during the cutting of the lean portion from the rib portion, and to variably adjust toward and away from the drum and cutting blade to accommodate a varying thickness lean portion, said cutting blade and second roller being mounted below the axis of the drum such that the lean portion will fall away from the rib portion and the rib portion will fall away from the drum when the lean portion is cut from the rib portion, and means for synchronously driving said drum and first roller to drive the rib plate toward the cutting blade and to synchronously drive the second roller with the drum during cutting of the lean portion from the rib portion.

26. The plate deboner of claim 25, wherein the first roller is mounted below the axis of the drum.

27. The plate deboner of claim 26, wherein said means urging the rib plate against the drum includes a guide plate.

28. The plate deboner of claim 27, which further includes means for reciprocating the cutting blade along the horizontal axis thereof.

29. The plate deboner of claim 28, wherein the first roller is larger than the second roller.

30. The plate deboner of claim 29, wherein said rollers include means for grippingly engaging the rib plate and lean portion.

31. The plate deboner of claim 30, wherein said cutting blade is adjustably mounted to accommodate rib plates from animals of different sizes.

* * * * *